United States Patent
He et al.

(10) Patent No.: US 10,599,176 B1
(45) Date of Patent: Mar. 24, 2020

(54) BANDGAP REFERENCE CIRCUIT AND HIGH-ORDER TEMPERATURE COMPENSATION METHOD

(71) Applicant: PURESEMI Co., Ltd., Nanjing (CN)

(72) Inventors: Shuzhuan He, Nanjing (CN); Zhaoyu Jiang, Nanjing (CN); Junjie Chen, Nanjing (CN)

(73) Assignee: PURESEMI Co., Ltd., Nanjing (CN)

( * ) Notice: Subject to any disclaimer, the term of this patent is extended or adjusted under 35 U.S.C. 154(b) by 0 days.

(21) Appl. No.: 16/396,547

(22) Filed: Apr. 26, 2019

(30) Foreign Application Priority Data

Sep. 5, 2018 (CN) .......................... 2018 1 1033528

(51) Int. Cl.
*G05F 3/26* (2006.01)

(52) U.S. Cl.
CPC .................... *G05F 3/262* (2013.01)

(58) Field of Classification Search
CPC . G05F 1/56; G05F 1/562; G05F 1/565; G05F 1/575; G05F 1/465; G05F 3/00; G05F 3/10; G05F 3/16; G05F 3/20; G05F 3/205; G05F 3/22; G05F 3/227; G05F 3/24; G05F 3/247; G05F 3/26; G05F 3/262; G05F 3/265; G05F 3/267
See application file for complete search history.

(56) References Cited

U.S. PATENT DOCUMENTS

| 6,894,473 | B1 * | 5/2005 | Le | G05F 3/30 323/314 |
| 7,224,209 | B2 * | 5/2007 | Hsu | G05F 3/30 323/312 |
| 7,834,610 | B2 * | 11/2010 | Peng | G05F 3/30 323/313 |
| 8,294,449 | B2 * | 10/2012 | Ide | G05F 3/30 323/314 |

(Continued)

FOREIGN PATENT DOCUMENTS

CN 107861557 A 3/2018

OTHER PUBLICATIONS

Shin, Ming-Hsien et al., Design of Wide-Supply-Voltage-Range Bandgap Reference Circuits for Voltage Regulators, IEEE, 2017, pp. 1867-1871, Department of Electrical Engineering, National Cheng Kung University, Tainan, Taiwan.

(Continued)

*Primary Examiner* — Jeffrey A Gblende
*Assistant Examiner* — Nusrat Quddus

(57) ABSTRACT

A bandgap reference circuit and a high-order temperature compensation method are disclosed. The bandgap reference circuit includes: a starting circuit, a bias circuit and a high-order compensated bandgap reference voltage generating circuit, where a compensation method of the high-order compensated bandgap reference voltage generating circuit is to perform curvature correction by using a subthreshold current of a CMOS transistor to obtain a high-order temperature-compensated bandgap reference voltage (Continued)

source circuit. The present circuit has the advantages that a manner not increasing circuit complexity can be adopted for implementation, the accuracy of a bandgap reference source can be greatly improved, and power consumption, chip area and cost are reduced.

7 Claims, 3 Drawing Sheets

(56) References Cited

U.S. PATENT DOCUMENTS

| | | | | |
|---|---|---|---|---|
| 8,493,130 | B2* | 7/2013 | Fukazawa | G05F 1/567 327/513 |
| 10,379,567 | B2* | 8/2019 | Sone | |
| 2009/0015332 | A1* | 1/2009 | Oberhuber | H03F 1/30 330/261 |
| 2009/0085549 | A1* | 4/2009 | Sengupta | G05F 3/30 323/313 |
| 2009/0115502 | A1* | 5/2009 | Sakiyama | G05F 3/262 327/539 |
| 2009/0167281 | A1* | 7/2009 | Jo | G05F 3/30 323/313 |
| 2015/0054485 | A1* | 2/2015 | Chou | G05F 3/16 323/313 |
| 2016/0026198 | A1* | 1/2016 | Eberlein | G05F 1/575 323/313 |
| 2016/0091916 | A1* | 3/2016 | Chang | G05F 3/262 323/268 |

OTHER PUBLICATIONS

Vermaas, Luiz L. G. et al., A Bandgap Voltage Reference Using Digital CMOS Process, IEEE, 1998, pp. 303-306, Itajuba, Brazil.

* cited by examiner

BANDGAP REFERENCE CIRCUIT AND HIGH-ORDER TEMPERATURE COMPENSATION METHOD

BACKGROUND

Technical Field

The present invention relates to the field of circuit technologies, and in particular, to a bandgap reference circuit and a high-order temperature compensation method.

Related Art

In the prior art, a bandgap reference circuit is an essential circuit module that is indispensable in an analog integrated circuit. It is widely used in LED drive circuits, switching power converters, digital to analog converters, analog to digital converters, and linear voltage regulators.

FIG. 1 shows a conventional bandgap reference voltage source having a working principle as follows: balancing by the summation of two voltages with opposite temperature coefficients: $V_{BE}$ with a negative temperature coefficient and a thermal voltage $V_T$ with a positive temperature coefficient. The thermal voltage is given by kT/q, where k is a Boltzmann constant, T is a temperature, and q is an electron charge. A high-gain operational amplifier has the same voltage at an operational amplifier input end. A current on the resistor R1 is I=$\Delta V_{EB}$/R$_1$=V$_T$*ln(n)/R$_1$, and an output reference voltage $V_{ref}$ is:

$$V_r = V_{E\,2} + \left(\frac{R_2}{R_1}\right) \cdot \left(\frac{k}{q}\right) \cdot l1\,(n) \qquad (1)$$

The negative temperature coefficient of VEB is non-linear, approximately −2 mV/° C. The positive temperature coefficient of VT is approximately +0.085 mV/° C., and by selecting an appropriate ratio of resistance values of R1 to R2, a bandgap reference voltage of a zero temperature coefficient at a certain temperature can be obtained.

FIG. 2 is a graph of temperature and voltage for a conventional bandgap reference. A dotted line $V_T$ is a thermal voltage, a dotted line $V_{EB}$ is a triode voltage, and a solid line $V_{ref}$ is a reference voltage of a weighted first-order temperature coefficient. It typically has a temperature drift from approximately 20 ppm/° C. to approximately 100 ppm/° C.

In order to improve the accuracy of a bandgap reference, various high-order temperature compensations for the bandgap reference have been proposed. However, a common high-order temperature compensation scheme has the following problems: 1) a compensation circuit is excessively complicated, and this increases the risk of process mismatch and increases the power consumption of a module; 2) a specific process is required, and this module cannot be manufactured by using a conventional process.

After retrieval, Chinese patent application No. 201711057698.0, filed on Mar. 30, 2018, disclosed a high-order temperature-compensated bandgap reference circuit of a diode through a MOS transistor, including a first-order bandgap reference circuit, a high-temperature region temperature curvature compensation circuit, a low-temperature region temperature segmented compensation circuit, and a starting circuit. In the present invention, a drain and substrate of a source-drain-gate shorted PMOS transistor respectively form a forward end and reverse end of a diode, a drain-substrate voltage of the source-drain-gate shorted PMOS transistor is used to generate a negative temperature coefficient voltage $V_{CTAT}$, a difference of drain-substrate voltages of two source-drain-gate shorted PMOS transistors is used to generate a positive temperature coefficient voltage $V_{PTAT}$, the negative temperature coefficient voltage $V_{CTAT}$ and the positive temperature coefficient voltage $V_{PTAT}$ are weighted to obtain a first-order bandgap reference voltage, and a high-temperature region temperature curvature compensation voltage $V_{NL1}$ and a low-temperature region temperature segmented compensation voltage $V_{NL2}$ are introduced into a first-order bandgap reference circuit to obtain a bandgap reference voltage with a low temperature coefficient, so as to obtain a high-order temperature-compensated bandgap reference circuit of a diode through a MOS transistor. However, this circuit implements a first-order bandgap reference voltage through a MOS transistor, and a complicated circuit is used to implement high-order temperature compensation. The present invention generates a bandgap reference through a conventional triode structure, and uses a sub-threshold current of an NMOS transistor to implement high-order compensation, which is excessively complicated, increases the risk of process mismatch, and increases the power consumption, cost and reject rate of modules.

SUMMARY

1. Technical Problem to be Solved

For the problems in the prior art that compensation circuits are excessively complicated, which increases the risk of process mismatch and improves the power consumption of modules, some circuits require a specific process, and modules cannot be manufactured by using a conventional process, the present invention provides a bandgap reference circuit and a high-order temperature compensation method, which can simply and efficiently improve the accuracy of a bandgap reference source, achieve a simple circuit structure, and cannot increase the power consumption of a module or improve the requirements for a power voltage.

2. Technical Solution

An objective of the present invention is achieved by the following technical solution.

A bandgap reference circuit using high-order temperature compensation by a sub-threshold current includes:

a high-order compensated bandgap reference voltage generating circuit, adapted to perform high-order compensation on a temperature coefficient of a reference power voltage by using a sub-threshold current of a gate-source shorted NMOS transistor;

a bias circuit, adapted to: provide a bias current for an operational amplifier OP of the high-order compensated bandgap reference voltage generating circuit and provide a pull-down current for a starting circuit; and the starting circuit, adapted to provide a starting current for the high-order compensated bandgap reference voltage generating circuit.

Further, the high-order compensated bandgap reference voltage generating circuit includes a conventional bandgap reference generating circuit and two NMOS transistors MN1 and MN2.

Further, the conventional bandgap reference generating circuit includes resistors R1, R2 and R3, PNP transistors Q1 and Q2, PMOS transistors MP1 and MP2, NMOS transistors MN1 and MN2, and an operational amplifier OP.

Sources of MP1 and MP2 are connected to VDD, gates of MP1 and MP2 are connected to an output of the operational amplifier OP, a drain of MP1 is connected to the first end of R3, a drain of MP2 is connected to an output $V_{ref}$ and the first end of R2, the second end of R3 is connected to the first end of the operational amplifier OP, a drain end of MN1 and the first end of R1, the second end of R2 is connected to an emitter of Q2 and a drain of MN2, the second end of R1 is connected to an emitter of Q1, and bases and collectors of Q1 and Q2, sources of MN1 and MN2 are grounded to VSS.

Further, the bias circuit includes a PMOS transistor MP3 and an NMOS transistor MN3; a gate of MP3 is connected to gates of MP1 and MP2 in the high-order compensated bandgap reference voltage generating circuit and a drain of MN5 in the starting circuit, a source of MP3 is connected to VDD, a drain of MP3 is connected to a drain and gate of MN3 and a gate of MN4 in the starting circuit, and a source of MN3 is grounded to VSS.

Further, MP3 in the bias circuit and MP1 and MP2 in the high-order compensated bandgap reference voltage generating circuit form a current mirror, and MN3 and MN4 in the starting circuit form a current mirror.

Further, the starting circuit includes PMOS transistors MP4 and MP5, and NMOS transistors MN4 and MN5; a source of MP4 is connected to VDD, and a drain of MP4 is connected to a source of MP5; gates of MP4 and MP5 are grounded to VSS; a drain of MP5 is connected to a gate of MN5 and a drain of MN4, a drain of MN5 is connected to the gate of MP3 in the bias circuit and gates of MP1 and MP2 in the high-order compensated bandgap reference voltage generating circuit, and a source of MN5 is grounded to VSS; a gate of MN4 is connected to the gate and the drain of MN3 in the bias circuit and the drain of MP3, and the source of MN4 is grounded to VSS.

Further, when the starting circuit is powered on by a power supply VDD, the starting circuit makes the high-order compensated bandgap reference voltage generating circuit separated from a "zero" operation point, so that a reference voltage enters a normal working state, and once a reference is established, the starting circuit is turned off.

Further, when started, MP4 and MP5 in the starting circuit provide a small current, so that MN5 is turned on to make the high-order compensated bandgap reference voltage generating circuit separated from a "zero" operation point, and once a reference is established, MN4 is turned on and MN5 is turned off.

A high-order temperature compensation method of a bandgap reference circuit includes the following steps:

using the bandgap reference circuit described above, when the starting circuit is started, the power voltage VDD rises, MP4 and MP5 branches generate a small current to flow toward the gate of MN5, after MN5 is turned on, the gates of MP1 and MP2 are pulled down to make the bandgap reference voltage generating circuit separated from a "zero" operation point, and voltages of nodes a and b are equal to each other and equal to $V_{EB2}$ under a joint action of clamping of the operational amplifier OP; and adjusting the size of a device to make MP1 equals to MP2, R2 equals to R3 and MN1 equals to MN2, so that the magnitude of a current I1 is equal to that of a current flowing through the resistor R1: $I = \Delta V_{EB}/R_1$, where a sub-threshold current flowing through MN2 is I2, the magnitude of I2 can vary from picoampere to nanoampere with a rise of temperature, and an obtained bandgap reference voltage with a high-order temperature compensation is:

$$V_r = V_{E2} + \left(\frac{R_2}{R_1}\right) \cdot \left(\frac{k}{q}\right) \cdot l1\,(n) + I_2 \cdot R_2 \qquad (2)$$

3. Beneficial Effect

Compared with the prior art, the present invention has the following advantages:

The present invention is a simple and efficient compensation circuit for improving the accuracy of a bandgap reference source. The compensation method of the circuit is to perform curvature correction by using a sub-threshold current of a CMOS transistor, where a temperature coefficient thereof can reach 6 ppm/° C. The circuit is simple in structure, does not increase the power consumption of a module or increase the requirements for a power voltage, and can be implemented in any CMOS process. A manner not increasing circuit complexity can be adopted for implementation, the accuracy of a bandgap reference source can be greatly improved, and power consumption, chip area and cost are reduced.

DESCRIPTION OF THE REFERENCE SIGNS

1, High-order compensated bandgap reference voltage generating circuit; 2, bias circuit; 3, starting circuit.

DETAILED DESCRIPTION

The present invention will be described in detail below with reference to the drawings and specific embodiments.

Embodiment 1

The present invention will now be described in detail with reference to the drawings.

Since a bandgap reference varies with temperature due to several non-ideal effects: a temperature coefficient of a resistor, a gain of a clamping operational amplifier, a parasitic current, channel length modulation, and the nonlinearity of a $V_{BE}$ temperature coefficient. Among these factors, the nonlinearity of the $V_{BE}$ temperature coefficient is the main reason. The formula for $V_{BE}$ variation with temperature is:

$$V_B(T) = V_{g0} - \frac{T}{T_H} \cdot [V_{g0} - V_B(T_R)] - (\eta - \alpha) \cdot V_T \cdot l1\left(\frac{T}{T_H}\right) \qquad (3)$$

where $V_{g0}$ is the voltage between base and emitter when temperature is 0 K, $T_R$ is room temperature, η is a process-dependent constant, independent of temperature, ranging from 3 to 3.5, and α is an index of a collector current temperature T.

The second item on the right of equation in Formula (3) is a first-order function of temperature, which can be canceled by a thermal voltage $V_T$ with a positive temperature coefficient, but the third item on the right of the equation, $V_T*\ln(T)$, is a high-order term of temperature. To obtain a high-precision bandgap reference, high-order temperature compensation needs to be performed.

Figure 1:
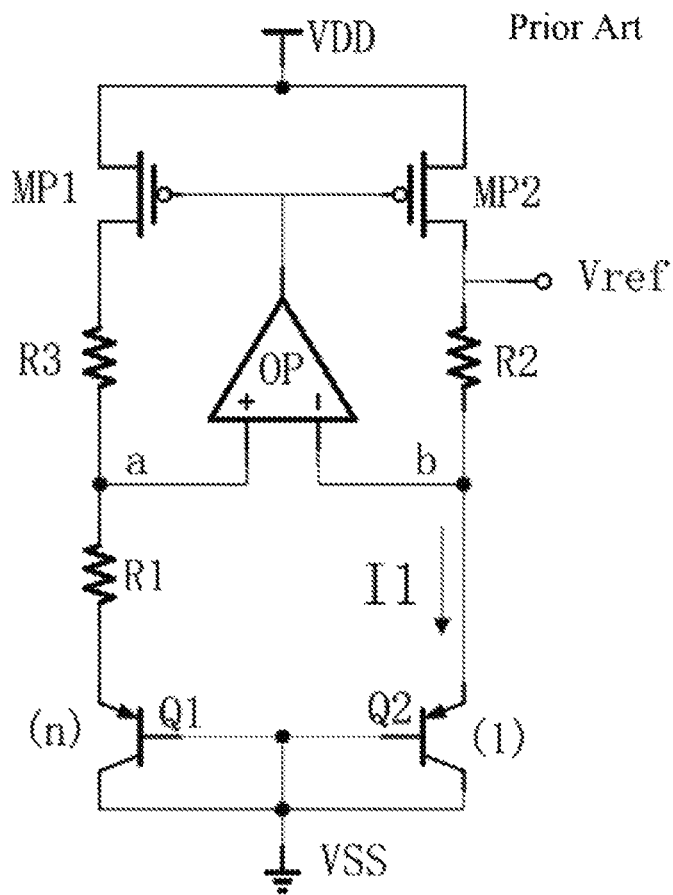
FIG. 1 is a schematic diagram of a commonly used bandgap reference voltage source.
Figure 2:
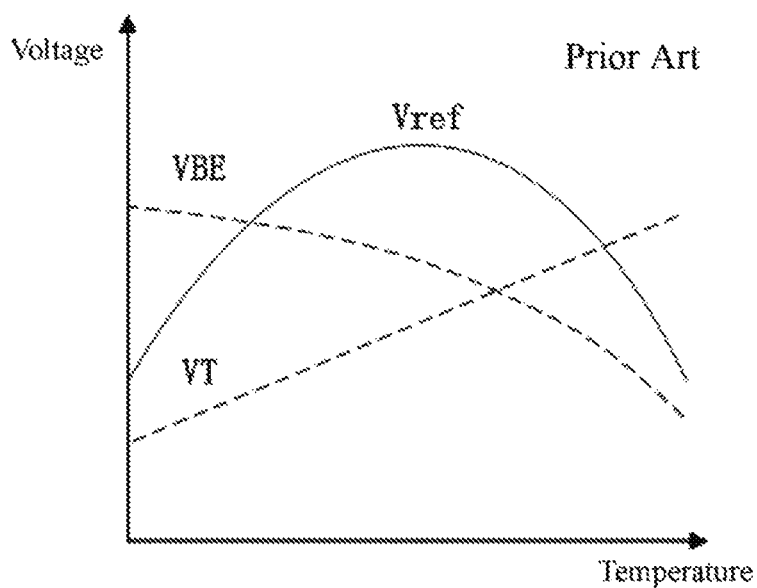
FIG. 2 is a schematic diagram of a first-order temperature compensation principle of a bandgap reference voltage.
Figure 3:
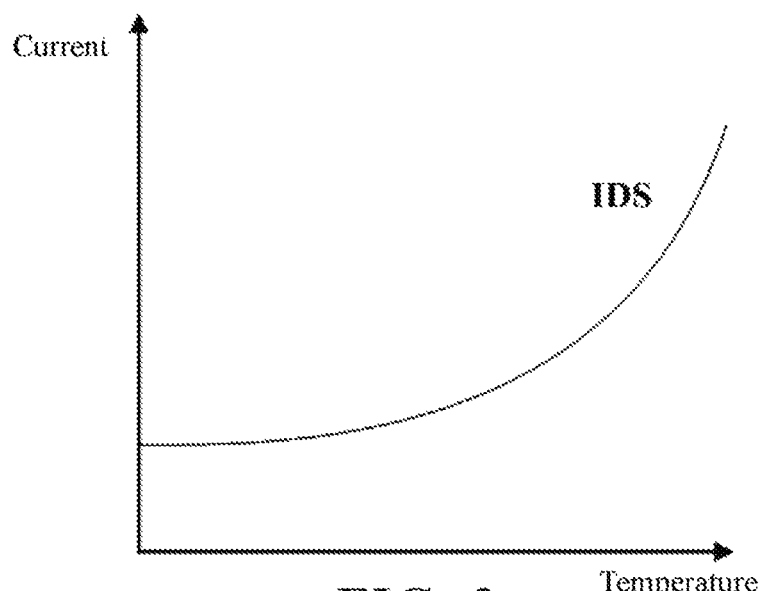
FIG. 3 is a schematic diagram of a current temperature trend of a gate-source shorted sub-threshold current of an NMOS.

The technology proposed by the present invention uses a sub-threshold current of an NMOS transistor with the gate-source voltage (VGS) equal to zero, to compensate for a temperature coefficient. For a long channel device working in a weak inversion region where a drain-source voltage is above 0.1 V, a drain-source current IDS is given by the following formula:

$$I_D = 2 \cdot m \cdot u \cdot C_O \cdot S \cdot V_T^2 \cdot e^{\left(\frac{v_G - V_T}{m \cdot V_T}\right)} \quad (4)$$

where m is a slope factor, u is mobility, $C_{OX}$ is a gate oxide capacitance, S is (W/L), and $V_{TH}$ is an MOS tube threshold voltage. It can be calculated that the temperature coefficient of IDs approximates an index, as shown in FIG. 3. When the temperature coefficient of the sub-threshold current approximates an index, it can be used to compensate for high-order terms of the bandgap reference.

Figure 5:
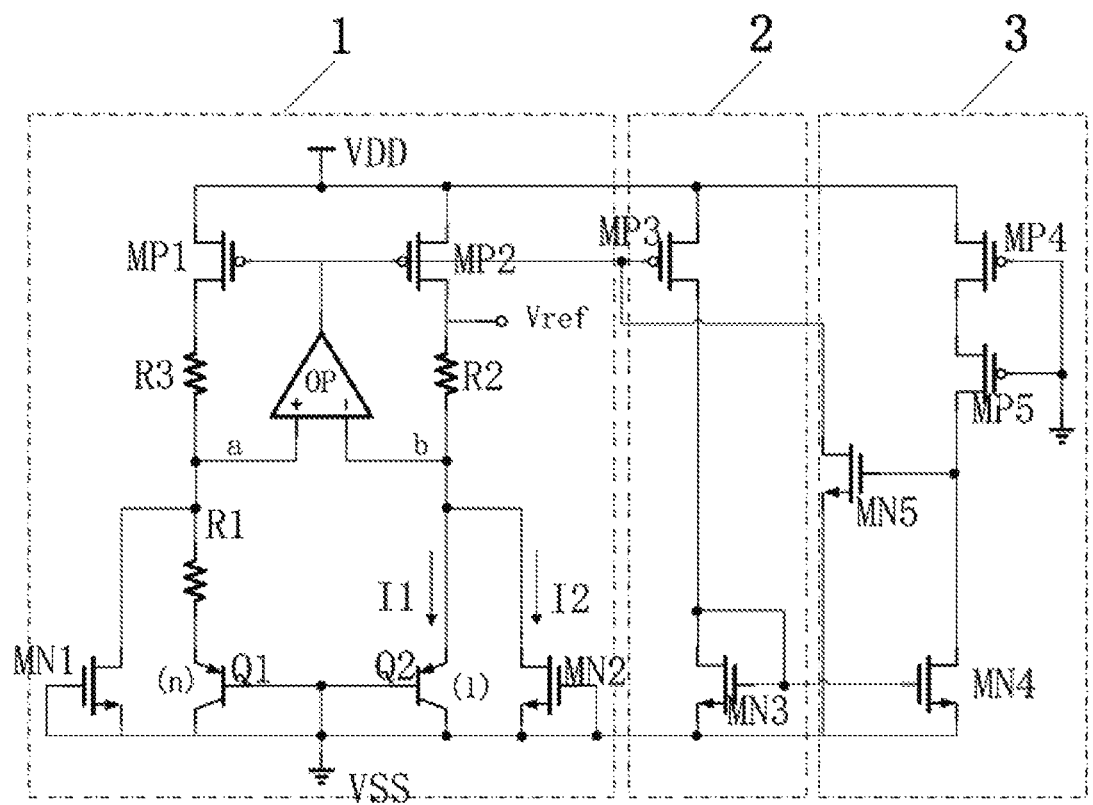
FIG. 5 is a schematic diagram of a bandgap reference circuit for high-order temperature compensation using a sub-threshold current provided by the present invention.

As shown in FIG. 5, a bandgap reference circuit for high-order temperature compensation using a sub-threshold current specifically provided by the present invention includes: a high-order compensated bandgap reference voltage generating circuit 1, a bias circuit 2 and a starting circuit 3.

The high-order compensated bandgap reference voltage generating circuit 1 includes resistors R1, R2 and R3. PNP transistors Q1 and Q2, PMOS transistors MP1 and MP2, NMOS transistors MN1 and MN2, and an operational amplifier OP, where the resistors R1, R2 and R3, the PNP transistors Q1 and Q2, the operational amplifier OP, and the PMOS transistors MP1 and MP2 form a conventional bandgap reference generating circuit, and the NMOS transistors MN1 and MN2 provide a high-order temperature-compensated sub-threshold current.

Sources of MP1 and MP2 in the high-order compensated bandgap reference voltage generating circuit 1 are connected to VDD, gates of MP1 and MP2 are connected to an output of the operational amplifier OP, a drain of MP1 is connected to a first end of R3, a drain of MP2 is connected to an output $V_{ref}$ and a first end of R2, a second end of R3 is connected to a first end of the operational amplifier OP, a drain end of MN1 and a first end of R1, a second end of R2 is connected to an emitter of Q2 and a drain of MN2, a second end of R1 is connected to an emitter of Q1, and bases and collectors of Q1 and Q2 and sources of MN1 and MN2 are grounded to VSS.

The bias circuit 2 provides a bias voltage of a pull-down tube MN4 in the starting circuit, and a bias voltage of the operational amplifier in the high-order compensated bandgap reference voltage generating circuit.

The bias circuit 2 includes a PMOS transistor MP3 and an NMOS transistor MN3, where MP3 and MP1 and MP2 in the high-order compensated bandgap reference voltage generating circuit form a current mirror, and MN3 and MN4 in the starting circuit form a current mirror.

A gate of MP3 in the bias circuit 2 is connected to the gates of MP1 and MP2 in the high-order compensated bandgap reference voltage generating circuit and a drain of MN5 in the starting circuit, a source of MP3 is connected to VDD, a drain of MP3 is connected to a drain and gate of MN3 and a gate of MN4 in the starting circuit 3, and a source of MN3 is grounded to VSS.

The high-order compensated bandgap reference voltage generating circuit 1 combines linear positive temperature characteristics of $\Delta V_{EB}$, nonlinear negative temperature characteristics of $V_{BE}$ and NMOS gate-source connected sub-threshold current positive temperature index characteristics to construct a compensation circuit for high-order temperature characteristics.

When the starting circuit 3 is powered on by a power supply VDD, the starting circuit assists the high-order compensated bandgap reference voltage generating circuit to be separated from a "zero" operation point to make it enter a normal working state, and once the reference is established, the starting circuit is turned off.

The starting circuit 3 includes PMOS transistors MP4 and MP5, and NMOS transistors MN4 and MN5, where when started, MP4 and MP5 provide a small current, so that MN5 is turned on to assist the circuit to be separated from a "zero" operation point, and once the reference is established, MN4 is turned on and MN5 is turned off.

A method of a bandgap reference circuit for high-order temperature compensation using a sub-threshold current of the present invention is described below with reference to FIG. 5.

According to FIG. 5, during starting, a power voltage VDD rises, MP4 and MP5 branches generate a nanoampere-magnitude small current to flow toward a gate of MN5, after MN5 is turned on, gates of MP1 and MP2 are pulled down to make a bandgap reference voltage generating circuit separated from a "zero" operation point. Under the joint action of clamping of an operational amplifier OP, voltages of nodes a and b are equal to each other and equal to $V_{EB2}$, approximately 0.7 V.

The size of a device is adjusted to make MP1 equal to MP2, R2 equal to R3 and MN1 equal to MN2, so that the magnitude of a current I1 is equal to that of a current flowing through a resistor R1: $I=\Delta V_{EB}/R_1$.

A sub-threshold current flowing through MN2 is I2, the magnitude of I2 may vary from picoampere to nanoampere with the rise of temperature. An obtained bandgap reference voltage with a high-order temperature compensation is:

$$V_r = V_{E\,2} + \left(\frac{R_2}{R_1}\right) \cdot \left(\frac{k}{q}\right) \cdot l1\,(n) + I_2 \cdot R_2 \quad (5)$$

Figure 4:
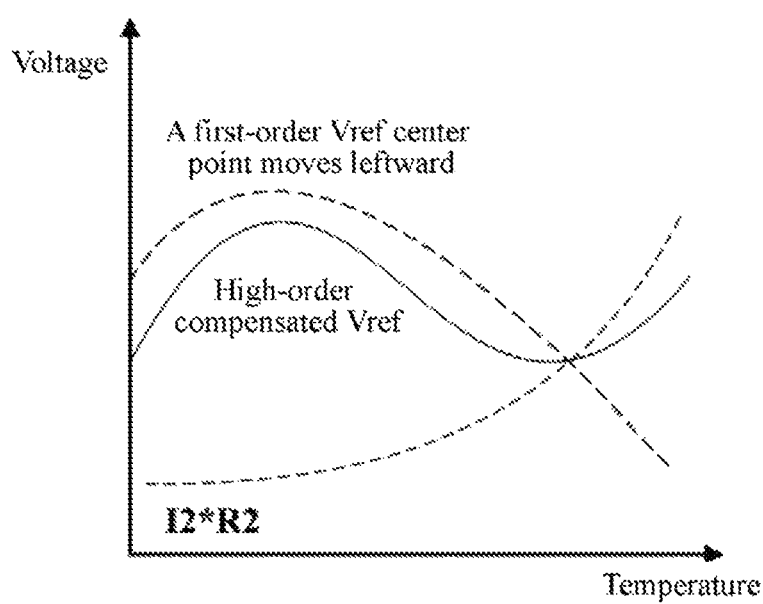
FIG. 4 is a schematic diagram of a high-order temperature compensation principle in the present invention.

FIG. 4 is a schematic diagram of a high-order compensation principle of the present invention. First, reducing the value of the resistor R2 by 5% to 10%, the zero point of a temperature curve moves leftward, a dotted line in the figure is "a first-order $V_{ref}$ center point moves leftward", then a sub-threshold current is multiplied by a positive temperature voltage of the resistor, I2*R2, for high-order compensating, and the temperature coefficient can reach 6 ppm/° C.

The above is only the preferred embodiment of the present invention and is not intended to limit the scope of implementation of the present invention; all changes and improvements made in accordance with the scope of the present application should still be covered within the patents of the present invention.

The present invention and its embodiments have been described above schematically without limitation, and the present invention can be embodied in other specific forms without departing from the spirit or essential features of the present invention. The drawings are only one of the embodiments of the present invention, the actual structure is not limited thereto, and any reference signs in the claims should not limit the involved claims. Therefore, if those of ordinary skill in the art are inspired by it, the structural manners and embodiments similar to the technical solution are not creatively designed without departing from the purpose of the present invention, and should fall within the scope of protection of the present patent. In addition, the word "including" does not exclude other elements or steps, and the word "a/an" in front of an element does not exclude "multiple" elements. Multiple elements recited in the claims of the product can also be implemented by one element through software or hardware. The words such as first and second are used to denote names and do not denote any particular order.

What is claimed is:

1. A bandgap reference circuit, comprising:
   a high-order compensated bandgap reference voltage generating circuit (1), adapted to perform high-order compensation on a temperature coefficient of a reference power voltage by using a sub-threshold current of a gate-source shorted NMOS transistor;
   a bias circuit (2), adapted to provide a bias current for an operational amplifier OP of the high-order compensated bandgap reference voltage generating circuit (1) and provide a Dull-down current for a starting circuit (3); and
   the starting circuit (3) adapted to provide a starting current for the high-order compensated bandgap reference voltage generating circuit (1),
   wherein the high-order compensated bandgap reference voltage generating circuit (1) comprises a conventional bandgap reference generating circuit and two NMOS transistors MN1 and MN2,
   wherein the conventional bandgap reference generating circuit comprises resistors R1, R2 and R3, PNP transistors Q1 and Q2, PMOS transistors MP1 and MP2, NMOS transistors MN1 and MN2, and an operational amplifier OP; and
   wherein sources of MP1 and MP2 are connected to VDD, gates of MP1 and MP2 are connected to an output of the operational amplifier OP, a drain of MP1 is connected to the first end of R3, a drain of MP2 is connected to an output $V_{ref}$ and the first end of R2, the second end of R3 is connected to the first input point a of the operational amplifier OP, a drain end of MN1 and the first end of R1, the second end of R2 is connected to an emitter of Q2 and a drain of MN2, the second end of R1 is connected to an emitter of Q1, and bases and collectors of Q1 and Q2, the drain end of MN1 is connected to the first input a of OP, the drain of MN2 is connected to a second input point b of OP, and the gates of MN1 and MN2 are grounded, and sources of MN1 and MN2 are grounded to VSS.

2. The bandgap reference circuit according to claim 1, wherein the bias circuit (2) comprises a PMOS transistor MP3 and an NMOS transistor MN3; a gate of MP3 is connected to gates of MP1 and MP2 in the high-order compensated bandgap reference voltage generating circuit (1) and a drain of MN5 in the starting circuit (3), a source of MP3 is connected to VDD, a drain of MP3 is connected to a drain and gate of MN3 and a gate of MN4 in the starting circuit (3), and a source of MN3 is grounded to VSS.

3. The bandgap reference circuit according to claim 2, wherein MP3 in the bias circuit (2) and MP1 and MP2 in the high-order compensated bandgap reference voltage generating circuit (1) form a current mirror, and MN3 and MN4 in the starting circuit (3) form a current mirror.

4. The bandgap reference circuit according to claim 1, wherein the starting circuit (3) comprises PMOS transistors MP4 and MP5, and NMOS transistors MN4 and MN5;
   a source of MP4 is connected to VDD, and a drain of MP4 is connected to a source of MP5; gates of MP4 and MP5 are grounded to VSS; a drain of MP5 is connected to a gate of MN5 and a drain of MN4, a drain of MN5 is connected to a gate of MP3 in the bias circuit 2 and gates of MP1 and MP2 in the high-order compensated bandgap reference voltage generating circuit (1), and a source of MN5 is grounded to VSS; a gate of MN4 is connected to a gate and a drain of MN3 in the bias circuit (2) and a drain of MP3, and a source of MN4 is grounded to VSS.

5. The bandgap reference circuit according to claim 4, wherein when the starting circuit (3) is powered on by a power supply VDD, the starting circuit (3) makes the high-order compensated bandgap reference voltage generating circuit (1) separated from a "zero" operation point, so that a reference voltage enters a normal working state, and once a reference is established, the starting circuit is turned off.

6. The bandgap reference circuit according to claim 4, wherein when started, MP4 and MP5 in the starting circuit (3) provide a small current, so that MN5 is turned on to make the high-order compensated bandgap reference voltage generating circuit (1) separated from a "zero" operation point, and once a reference is established, MN4 is turned on and MN5 is turned off.

7. A high-order temperature compensation method of a bandgap reference circuit, comprising the following steps:
   using the bandgap reference circuit according to claim 1, wherein when the starting circuit (3) is started, the power voltage VDD rises, MP4 and MP5 branches generate a small current to flow toward the gate of MN5, after MN5 is turned on, the gates of MP1 and MP2 are pulled down to make the bandgap reference voltage generating circuit separated from a "zero" operation point, and voltages of input points a and b of the operational amplifier OP are equal to each other and equal to an emitter-base voltage $V_{EB2}$ of Q2 under a joint action of clamping of the operational amplifier OP; and
   adjusting the size of a device to make MP1 equals to MP2, R2 equals to R3 and MN1 equals to MN2, so that the magnitude of a current I1 flowing through Q2 is equal to that of a current flowing through the resistor R1, wherein
   a sub-threshold current flowing through MN2 is I2, the magnitude of I2 can vary from picoampere to nanoampere with a rise of temperature, and an obtained bandgap reference voltage with a high-order temperature compensation is:

$$V_{ref} = V_{EB2} + \left(\frac{R_2}{R_1}\right) \cdot \left(\frac{kT}{q}\right) \cdot \ln(n) + I_2 \cdot R_2$$

wherein k is a Boltzmann constant, T is a temperature, q is an electron charge, and n is a scaling factor between Q1 and Q2.

\* \* \* \* \*